US011938453B2

(12) United States Patent
Van De Sluis et al.

(10) Patent No.: US 11,938,453 B2
(45) Date of Patent: Mar. 26, 2024

(54) WATER DISPENSERS FOR DISPENSING CARBONIZED WATER AND METHOD

(71) Applicant: Apiqe Holdings, LLC, Torrance, CA (US)

(72) Inventors: Jasper Jacobus Van De Sluis, Le Utrecht (NL); Mattheus Pieter Both, Ee Apeldoorn (NL)

(73) Assignee: Apiqe Holdings, LLC, Torrance, CA (US)

( * ) Notice: Subject to any disclaimer, the term of this patent is extended or adjusted under 35 U.S.C. 154(b) by 0 days.

(21) Appl. No.: 17/875,111

(22) Filed: Jul. 27, 2022

(65) Prior Publication Data

US 2022/0355255 A1 Nov. 10, 2022

Related U.S. Application Data

(63) Continuation of application No. 16/466,960, filed as application No. PCT/NL2017/050813 on Dec. 5, 2017, now Pat. No. 11,413,587.

(30) Foreign Application Priority Data

Dec. 6, 2016 (NL) ..................................... 2017940

(51) Int. Cl.

*B01F 3/04* (2006.01)
*B01F 23/236* (2022.01)

(Continued)

(52) U.S. Cl.

CPC ........ *B01F 23/2362* (2022.01); *B01F 33/821* (2022.01); *B01F 23/2364* (2022.01);

(Continued)

(58) Field of Classification Search

CPC .. B01F 23/2362; B01F 23/2364; B01F 25/25; B01F 33/821; B01F 33/834; B67D 1/0058; B67D 1/0071

(Continued)

(56) References Cited

U.S. PATENT DOCUMENTS 3,761,066 A 9/1973 Wheeler
3,780,198 A 12/1973 Pahl et al.

(Continued)

FOREIGN PATENT DOCUMENTS

EP 1580503 A1 9/2005
WO WO-2005/003019 A2 1/2005

(Continued)

OTHER PUBLICATIONS

International Search Report & Written Opinion for PCT/NLK2017/050813, dated May 16, 2018, 18 pages.

*Primary Examiner* — Charles S Bushey
(74) *Attorney, Agent, or Firm* — Blank Rome LLP

(57) ABSTRACT

A carbonized water dispensing device is provided with a carbonized water conditioning chamber, which conditioning chamber is provided downstream of the carbonator and upstream of the carbonized water dispensing outlet, for receiving a mixture of carbonized water mixed with unresolved $CO_2$. The conditioning chamber is dimensioned to hold a single serve of carbonized water with a headspace, and which carbonized water conditioning chamber is provided with an outlet valve and a gas outlet. The carbonized water dispensing device is configured to, upon receiving a beverage dispensing order, provide the empty carbonized water conditioning chamber with a single serve volume of carbonized water, and hold the single serve of carbonized water prior to dispensing the single serve volume of carbonized water.

12 Claims, 2 Drawing Sheets

(51) Int. Cl.

| | |
|---|---|
| ***B01F 33/82*** | (2022.01) |
| *B01F 25/25* | (2022.01) |
| *B01F 33/80* | (2022.01) |
| *B67D 1/00* | (2006.01) |

(52) U.S. Cl.
CPC ............. *B01F 25/25* (2022.01); *B01F 33/834* (2022.01); *B67D 1/0058* (2013.01); *B67D 1/0071* (2013.01)

(58) Field of Classification Search
USPC ...................................................... 261/DIG. 7
See application file for complete search history.

(56) References Cited

U.S. PATENT DOCUMENTS

| | | | | |
|---|---|---|---|---|
| 3,926,342 | A | 12/1975 | Selvia | |
| 3,997,631 | A | 12/1976 | Matsuoka et al. | |
| 4,562,013 | A | 12/1985 | Jeans | |
| 4,655,124 | A | 4/1987 | Child | |
| 4,950,431 | A | 8/1990 | Rudick | |
| 7,114,707 | B2 | 10/2006 | Rona | |
| 9,309,103 | B2 | 4/2016 | Ergican | |
| 11,413,587 | B2 * | 8/2022 | Van De Sluis | B67D 1/007 |
| 2011/0268845 | A1 | 11/2011 | Fantappiè | |
| 2011/0315711 | A1 * | 12/2011 | Hecht | B67D 1/0895 222/144.5 |
| 2013/0062366 | A1 * | 3/2013 | Tansey | B67D 1/0809 222/101 |
| 2014/0239519 | A1 | 8/2014 | Erigican et al. | |
| 2015/0024088 | A1 | 1/2015 | Cohen | |
| 2016/0106136 | A1 | 4/2016 | Gordon et al. | |
| 2016/0136590 | A1 | 5/2016 | Campbell | |

FOREIGN PATENT DOCUMENTS

| | | |
|---|---|---|
| WO | WO-2016/081477 A2 | 5/2016 |
| WO | WO-2016/081480 A2 | 5/2016 |

* cited by examiner

WATER DISPENSERS FOR DISPENSING CARBONIZED WATER AND METHOD

RELATED APPLICATIONS

This application is a continuation application of U.S. patent application Ser. No. 16/466,960, filed on Jun. 5, 2019, now U.S. Pat. No. 11,413,587, which is a national phase of PCT/NL2017/050813, filed on Dec. 5, 2017, which claims priority to The Netherlands Patent Application No. 2017940, filed on Dec. 6, 2016. The entire contents of these applications are hereby incorporated by reference.

BACKGROUND

Numerous types of water dispensers for dispensing carbonized water are available. Water dispensers may be standalone devices, or incorporated into an appliance such as a refrigerator. Most commercialized devices for carbonating water comprise a cooled and pressurized water storage reservoir, also referred to as a carbonating tank or saturator.

The water cooling reservoir is typically configured to hold a volume of water sufficient for multiple servings, to allow for dispensing multiple servings of cooled water one after the other. Furthermore, the water cooling reservoir is pressurized with carbon dioxide ($CO_2$), such that $CO_2$ is added to the water. Thus, a pressurized multiple servings volume of cooled and carbonized water is held in the storage reservoir.

As an alternative to pressurized cooling reservoirs, in-line carbonators are used. In such a dispenser, the $CO_2$ is added to the water while it flows from the multiple servings cooled reservoir to the dispensing outlet. Thus, the cooled water does not need to be stored under pressure, which allows for simplified design of the reservoir.

It is submitted that, although prior art water dispensers are able to provide carbonized water, the carbonization level of the dispensed water is poor compared to bottled carbonized water. It is both difficult to dissolve sufficient $CO_2$ in the water and to do this in a way that the $CO_2$ is held for a prolonged period of time. This is in particular the case when using in-line carbonization devices.

SUMMARY

It is an object of the invention to provide a carbonized water dispenser in which the above mentioned drawbacks are eliminated altogether or occur in a greatly reduced extent. In particular it is an object of the first aspect of the invention to provide a carbonized water dispenser able to provide carbonized water with an increased $CO_2$ content.

According to the present invention, this object is achieved by designing a carbonated water dispenser featuring a carbonized water conditioning chamber. Carbonated water dispensers of the type described herein provide improved levels of carbonation with the use of a conventional in-line carbonator.

A carbonized water dispensing device according to the invention comprises:

- a carbonized water dispensing outlet, for dispensing a single serve carbonized water volume into a beverage container;
- a cold water source;
- a $CO_2$ source;
- a water line, which preferably is a chilled water line, the water line extending between the cold water source and the dispensing outlet;

- a water carbonation system comprising a carbonator, preferably an in-line carbonator provided in the water line, for adding $CO_2$ from the $CO_2$ source to the water flowing through the water line from the cold water source to the carbonized water dispensing outlet, the $CO_2$ preferably being added at a water pressure in the range of 5-9 bar;
- preferably, an in-line flow compensator, provided in the water line and downstream of the in-line carbonator, for conditioning the flow of carbonized water;
- preferably, a water pump for pumping a single serve volume of chilled water under pressure, preferably a pressure in the range of 5-9 bar, through the water line and through the carbonator of the water carbonation system; and
- a user interface comprising a control device configured to receive a beverage dispensing order, and subsequently actuate the carbonized water dispensing device to dispense a single serve volume of carbonized water;

wherein, the carbonation system further comprises:

- a carbonized water conditioning chamber, which conditioning chamber is provided downstream of the carbonator and upstream of the carbonized water dispensing outlet, for receiving a mixture of carbonized water mixed with undissolved $CO_2$, which conditioning chamber is dimensioned to hold a single serve of carbonized water with a headspace, and which carbonized water conditioning chamber is provided with:
  - an outlet valve for in a closed condition enabling the carbonized water conditioning chamber to hold the single serve volume of carbonized water, and for in an open condition allowing the single serve volume of carbonized water to flow out of the carbonized water conditioning chamber and subsequently out of the carbonized water dispensing outlet into a beverage container;
  - a gas outlet for in a closed condition preventing undissolved $CO_2$ from escaping the conditioning chamber and thus enabling a pressure increase, preferably a pressure increase of up to 0.25-4 bar or more, in the conditioning chamber during the inflow of the mixture of the single serve volume of carbonized water and the undissolved $CO_2$, and for in an open condition allowing the pressure in the conditioning chamber to lower to atmospheric pressure or near atmospheric pressure, e.g. 0.1 bar (relative to the environmental pressure), prior to the single serve carbonized water volume flowing out of the conditioning chamber; and wherein the carbonized water dispensing device is configured to, upon receiving a beverage dispensing order, provide the empty carbonized water conditioning chamber with a single serve volume of carbonized water, and hold the single serve of carbonized water prior to dispensing the single serve volume of carbonized water.

According to the claimed invention, the carbonized water dispensing device is provided with an in-line carbonized water conditioning chamber, i.e. a conditioning chamber downstream of the carbonator and upstream of the carbonized water dispensing outlet, for receiving a single serve volume of carbonized water mixed with undissolved $CO_2$.

According to the invention, the single serve volume of carbonated water is received in the conditioning chamber, is held under pressure in that conditioning chamber, which pressure is subsequently lowered to atmospheric or near atmospheric pressure, after which the single serve volume is dispensed. Thus, a carbonized water dispenser according to the invention, compared to prior art carbonized water dispensers, provides an even flow of carbonized water, the carbonized water having an increased $CO_2$ content. It is furthermore submitted that the even, i.e. less turbulent, outflow of carbonized water also helps in maintaining the increased CO 2 levels for a prolonged period of time.

Furthermore, it is submitted that due to the pressure increase in the carbonized water conditioning chamber, which pressure increase is caused by said chamber being filled with the single serve of carbonized water mixed with undissolved $CO_2$, the turbulence of the flow of the mixture of carbonized water mixed with undissolved $CO_2$ into the carbonized water conditioning chamber is reduced. Thus, the degassing of $CO_2$ from the carbonized water is tempered.

Because the dispenser is able to provide beverages with a relatively high $CO_2$ content, a carbonized water dispensing device according to the invention is in particular useful in providing soda beverages, more in particular for combining the single serve carbonized water volume with a syrup, since these types of drinks are typically associated with high $CO_2$ content, i.e. compared to the $CO_2$ content of carbonized water dispensed by known carbonized water dispensers.

The invention is advantageously used in an in-line carbonization device for dispensing predetermined single serve volumes of carbonized water. In an embodiment, the water is carbonized using an in-line carbonator and an in-line flow compensator, such that with each serving, only the volume of water required for a single serve, i.e. a metered single serve volume, is carbonized while being dispensed. Thus, there is no reservoir, or a carbonating tank or saturator, for storing a large volume of pre-carbonized water, i.e. water carbonized prior to a consumer providing a dispensing order.

A dispenser according to the invention is configured to provide a consumer with a predetermined volume of carbonized water. Thus, the invention is in particular suited for use in carbonized water dispenser in the office environment or at home, to provide a consumer with the beverage of his or her choice. The predetermined volume can be received in a beverage container, e.g. a glass or cup. In an embodiment, the dispenser is configured for also allowing a consumer to fill a bottle with carbonized water.

Depending on the device, a single serve may comprise a volume of 100 ml for a small cup up to 1.1 litre for large cups. A dispenser can be configured for providing a predetermined volume, for example a single serve volume of 250 ml, or with a range of predetermined volumes, for example a range comprising a small volume of 200 ml up to a large volume of 1.2 litre. Also, in addition, a dispenser can be configured to fill a bottle, in which case the predetermined volume can be in the range of 0.250 litre, 0.5 litre and 1 litre. In an embodiment, the dispenser is configured to allow a consumer to specify the predetermined volume, for example by entering the desired volume via a user interface when providing the dispensing order.

In an embodiment, the conditioning chamber is dimensioned to receive a charge of carbonized water sufficient to allow a user to fill at a beverage container, e.g. a cup or glass, of average size. As such, the conditioning chamber may typically hold between 0.2 litre and 1.5 litre of carbonized water, preferably between 0.2 and 0.8 litre, most preferably about 0.25 litre of water.

In an embodiment, the dispenser is configured to provide 0.225-0.230 litre beverages with a high $CO_2$ content. In this embodiment, the volume of the carbonized water conditioning chamber is about 0.250 litre and the dispenser is configured to retain a beverage volume of about 0.225-0.230 of carbonized water in that conditioning chamber, providing a head space of about 0.025 litre.

According to the invention, the mixture of the single serve volume of carbonized water and the undissolved $CO_2$ flows into the carbonized conditioning chamber, which chamber is located downstream of the flow compensator and preferably directly downstream of an in-line flow compensator located in the water line downstream of the in-line carbonator and upstream of the conditioning chamber.

It is submitted that the carbonized water conditioning chamber is dimensioned such that it can hold a single serve of carbonized water with a headspace for holding the undissolved $CO_2$. The conditioning chamber is furthermore dimensioned such that, during the inflow of the mixture of the single serve volume of carbonized water and the undissolved $CO_2$ into the chamber, a pressure increase, preferably a pressure increase of up to 1.25-4 bar or more, is achieved in the conditioning chamber.

In an embodiment, the carbonized water conditioning chamber is dimensioned such that when it holds a single serve volume of carbonized water, the headspace has a volume in the range of 5%-50% of the single serve volume of carbonized water.

In an embodiment, the carbonized water conditioning chamber is an adaptable chamber, i.e. has a volume that can be adapted, for example has a moveable wall that allows for adapting the volume of the chamber. Such an adaptable carbonized water conditioning chamber allows for the volume of the carbonized water conditioning chamber to be adapted in dependency of the volume to be served, and thus allows for the dispenser to serve different single serve volumes, for example a small, a medium and a large volume serving, with a head space proportioned to said volumes, for example each with a head space volume of 20%.

In addition or as an alternative, a pressure source is provided for adding a gas, preferably $CO_2$, into the carbonized water conditioning chamber, preferably during or after the filling of the conditioning chamber with the single serve volume of carbonized water, to allow for the chamber to hold different single serve volume with a similar pressure.

In addition or as an alternative, the in-line carbonator is configured to provide additional $CO_2$ when a small single serve volume is dispensed, to compensate for the small volume of carbonized water and enable a sufficient increase in pressure in the carbonized water conditioning chamber during the inflow of the mixture of the single serve volume of carbonized water and the undissolved $CO_2$.

In an embodiment, the carbonized water dispensing device is configured to dispense beverages with different $CO_2$ content, for example beverages with comparatively low $CO_2$ content and more sparkling beverages with a high $CO_2$ content. In such an embodiment, the device, more in particular the outlet valve of the carbonized water conditioning chamber, can be configured to retain a single serve volume of carbonized water in the carbonized water conditioning chamber to increase the $CO_2$ content according to the invention and thus provide beverages with a high $CO_2$ content, and a single serve volume of carbonized water to flow directly through the conditioning chamber, i.e. without any retention, to thus provide beverages with a comparatively low $CO_2$ content. Also, when the dispensing device is configured to dispense flat water, i.e. water without added $CO_2$, this water can also flow directly through the carbonized water conditioning chamber.

In an embodiment, the dispenser comprises an ozone device upstream of the carbonized water conditioning chamber, which ozone device is configured to add ozone to the water flowing into the carbonized water conditioning chamber, such that the ozone can destroy any germs or similar holding in the carbonized water conditioning chamber or downstream thereof. In a further embodiment, the carbonized water conditioning chamber, more in particular the outlet valve of the carbonized water conditioning chamber, is configured to retain the water provided with ozone for a prolonged period of time in the carbonized water conditioning chamber and thus enable the ozone to better destroy any germs or similar material in said chamber. In yet a further embodiment, the device is configured to flush the water with ozone from the carbonized water conditioning chamber and/or flush through said chamber after the water with ozone has been drained from the chamber.

In an embodiment, the cold water source is configured for providing for providing multiple servings, preferably at least five servings.

In an embodiment, the cold water source comprises a cooling reservoir having a volume of multiple servings.

In an embodiment, the cold water source comprises a water supply. This supply can consist of a simple municipal or well water feed. Preferably, the cold water source comprises an extension of the water line, which extension passes through a chiller configured to cool the water in the water line. In an embodiment, the chiller is provided in the form of a reservoir that comprises a volume of cold water, and the water line passes through said volume of cold water such that the water in the water line is cooled. In a further embodiment, the section of the water line comprising the in-line carbonator is located within the volume of cold water of the cold water reservoir.

In an embodiment, the chiller is provided in the form of a reservoir that comprises a volume of cold water and the carbonized water conditioning chamber is located at least partially within the reservoir. Thus the carbonized water conditioning chamber is cooled by the cold water source, more in particular is cooled by the cooling device of the cold water reservoir.

In an embodiment, the reservoir is encased in a jacket of isolation material. In a further embodiment, the reservoir is encased in a jacket of isolation material and the carbonized water conditioning chamber is received within the same jacket of isolation material. In such an embodiment, the outlet valve of the carbonized water conditioning chamber and the gas outlet of the carbonized water conditioning chamber are located outside the jacket of isolation material.

The cold water source also optionally comprises a pump to provide a consistent water pressure. As the pressure at a typical home or commercial water tap may vary from location to location or from time to time, providing a pump will ensure that the apparatus receives a consistent pressure no matter what the local supply pressure is. This same goal of providing a consistent supply pressure can be achieved by other known techniques without departing from the scope of the disclosure. For example, an elevated water reservoir could use gravity and appropriately sized water conduits to provide a consistent water supply pressure.

The incoming water pressure affects the flow and pressure through the remainder of the water line. Preferably, a pressure of 6.5-8.5 bar is provided to achieve an optimal flow rate and carbonation.

The $CO_2$ (carbon dioxide) source can be embodied by any known way for supplying a gas. A commercially available $CO_2$ canister is preferably used. The $CO_2$ source would typically be connected through a regulator, which provides a controlled supply pressure to the in-line carbonator.

The $CO_2$ is provided at a pressure between 3 bar and 9 bar. Preferably, the carbon dioxide pressure provided at the in-line carbonator at a pressure substantially similar to the water pressure provided at the in-line carbonator.

The in-line carbonator, or solubilizer, can be an in-line carbonator known from the prior art, for example an in-line carbonator known from US2011/0268845, which is herewith incorporated by reference.

In an alternative embodiment, the carbonized water dispensing device is provided with an in-line carbonator for the solubilization of $CO_2$ (carbon dioxide) in water, the inline carbonator comprising:

- a tubular conduit disposed about a longitudinal axis, extending from an input end to and output end, and defining a fluid flow path from the input end to the output end;
- an inlet manifold comprising a first inlet for water, a second inlet for carbon dioxide, and an outlet in fluid communication with the input end of the conduit;
- wherein the conduit comprises a first treatment trajectory directly followed by a conditioning trajectory directly followed by a second treatment trajectory, such that the water subsequently flows from the first treatment trajectory into the conditioning trajectory into the second treatment trajectory;
- wherein each treatment trajectory comprises:
- a helical dispersion element disposed in the conduit and having an axis substantially aligned with the longitudinal axis of the conduit;
- a passive accelerator located immediately downstream of the helical dispersion element, wherein the passive accelerator comprises a restriction portion of the conduit having a reduced cross sectional area relative to portions of the conduit immediately upstream and downstream of the restriction portion;
- a rigid impact surface immediately downstream of the passive accelerator, which rigid impact surface is disposed substantially perpendicular to the longitudinal axis of the conduit; and
- wherein the conditioning trajectory comprises:
- a conditioning conduit extending between the first and second treatment trajectories, the conditioning conduit having an axis substantially aligned with the longitudinal axis of the conduit.

In an embodiment, the water carbonation system comprises an in-line flow compensator, provided in the water line downstream of the carbonator, preferably the in-line carbonator, and directly upstream of the carbonized water conditioning chamber. The in-line flow compensator, can be an in-line flow compensator known from the prior art, for example in-line flow compensator known from US2014239519, which is herewith incorporated by reference. In an embodiment, the carbonized water dispensing device is configured to mix the carbonized water with an ingredient, e.g. syrup, after the carbonized water has been held in the carbonized water conditioning chamber, preferably is incorporated in a prior art dispenser device configured for mixing carbonated water with syrup for example known from WO2016081477 or WO2016081480, which applications are both incorporated by reference herein.

In an embodiment, the dispenser comprises a seat for holding an ingredient cartridge downstream of the outlet valve of the carbonized water conditioning chamber and in the flow path of the carbonized water dispensed via said outlet valve. In addition or as an alternative, the dispenser comprises an ingredient outlet, for example a nozzle connected to an ingredient reservoir, for injecting ingredient into the flow of carbonized water and/or into the beverage container in which the single serve volume of carbonized water is dispensed.

The user interface can be embodied by any known user command input device for providing a dispenser with instructions to serve a metered volume of water, e.g. may comprise a mechanical device such as lever or tab, or an electronic interface linked to a pump and/or valves, etc. In an embodiment, the dispenser is configured to receive instructions via the internet or Wi-Fi, for example from an app on a smart phone. The user interface comprises a control device configured to receive a beverage dispensing order, and to subsequently actuate the carbonized water dispensing device to dispense a single serve volume of carbonized water. In an embodiment, the user interface allows for the user to choose between different size beverages, each having a for example a small, a medium and a large volume serving, and/or to adjust the single serve volume, for example when the single serve carbonized water volume is mixed with a predetermined volume of ingredient, to allow for a strong or a weak mixture of single serve volume carbonized water and ingredient.

In an embodiment, the carbonized water conditioning chamber is furthermore provided with a gas inlet connected to a pressurized gas source, preferably a $CO_2$ gas source, preferably the gas source providing $CO_2$ to the in-line carbonator, for providing a pressure in the conditioning chamber, preferably a pressure in the range of 1-4 bar, more preferably a pressure in the range of 2-3 bar, to urge the single serve of carbonized water volume out of the conditioning chamber, preferably providing the single serve carbonized water volume into a beverage container with an even flow rate.

Such an embodiment allows for a more accurate control of the pressure in the carbonized water conditioning chamber, and thus to adjust for fluctuations between servings in the undissolved $CO_2$ mixed with the carbonized water into the carbonized water conditioning chamber, for example due to difference in water temperature and/or pressure provided by the $CO_2$ source, etc.

Also, such an embodiment allows for holding different single serve volumes, e.g. a small, a medium and a large volume serving with similar pressures, prior to dispensing the single serve volume of carbonized water.

Preferably the gas source is a $CO_2$ gas to increase the $CO_2$ content in the headspace. In a particular advantageous embodiment, the $CO_2$ source that is provided for carbonization of the water is also used for providing the additional pressure, i.e. in addition to the pressure generated by the undissolved $CO_2$ that flows into the chamber with the carbonized water, in the conditioning chamber, preferably a pressure in the range of 1-4 bar.

In an embodiment, the gas outlet is configured to, or a further gas outlet is provided to, during the inflow of the mixture of the single serve volume of carbonized water and the undissolved $CO_2$, enable $CO_2$ to escape the conditioning chamber when a predetermined pressure is reached, which predetermined pressure is preferably in the range of 1.25-4 bar, to limit the maximum pressure in the conditioning chamber.

Such a gas outlet can also be used in combination with a gas inlet, as mentioned above, for providing a pressure in the conditioning chamber to urge the single serve of carbonized water volume out of the conditioning chamber. Thus, a gas, for example air or $CO_2$, can be fed into the carbonized water conditioning chamber, and the gas outlet serves as an overflow valve to keep the pressure in said chamber at a predetermined maximum.

In an embodiment, the carbonized water conditioning chamber is provided with a gas inlet configured to allow a gas, for example ambient air $CO_2$, to flow into the carbonized water conditioning chamber while the outlet valve is open and the carbonized water flows out of the carbonized water conditioning chamber. Thus, the pressure in the carbonized water conditioning chamber is substantially similar to the ambient pressure contributes to an even outflow of carbonated water from the carbonized water conditioning chamber.

In an embodiment, the gas inlet is provided with a filter, for example a HEPA filter, to prevent unwanted materials from entering the carbonized water conditioning chamber with the flow of gas. This is in particular beneficial when the gas inlet is configured to allow ambient air to flow into the carbonized water conditioning chamber, for example while the carbonized water flows out of the carbonized water conditioning chamber.

In an embodiment, the dispenser is configured to provide, i.e. the carbonized water conditioning chamber is dimensioned, different single serve volumes, for example a small, a medium and a large volume serving. Preferably, the flow of the mixture of the small volume single serve of carbonized water and the undissolved $CO_2$ into the carbonized water conditioning chamber provides a pressure increase sufficient to reach the predetermined pressure. Thus, the different single serve volumes can all be held in the carbonized water conditioning chamber without the need of adding additional pressure, for example by adding additional $CO_2$ from a $CO_2$ source.

In an embodiment, the device is configured to, after filling the conditioning chamber with the single serve carbonated water volume and prior to allowing the single serve carbonized water volume to flow out of the conditioning chamber, hold the single serve carbonated water volume for a retention period in the range of 0.5-8 seconds, preferably in the range of 0.5-4 seconds, for example for 2 seconds, the retention period including the pressure reduction in the conditioning chamber to atmospheric pressure or near atmospheric pressure.

Thus, the mixture of carbonized water mixed with undissolved $CO_2$ is allowed to settle and lower in pressure, which allows for a more even flow out of the conditioning chamber.

Furthermore, when the carbonized water is held under pressure with $CO_2$ in the headspace, additional $CO_2$ is allowed to dissolve into the carbonized water, and thus the $CO_2$ content of the water may increase.

A typical single serve volume of carbonized water is preferably held for a period in the range of 0.2 and 5 seconds. Preferably, in a device according to the invention, a single serve volume of carbonized water is held for a period in the range of 0.2 and 5 seconds, preferably in the range of 2 and 4 seconds, for example is held for 3 seconds, after which the pressure is lowered to an atmospheric or near atmospheric pressure, allowing the single serve volume of carbonized water to flow from the conditioning chamber without a serious pressure drop.

It is furthermore submitted that the amount of $CO_2$ dispersed into the carbonised water can be controlled by controlling the input pressure of the $CO_2$. This can for example be achieved by providing the $CO_2$ source with a controlled valve, preferably a valve controlled by the control device of the user interface. Thus the valve can be used to throttle the flow of $CO_2$. In an alternative embodiment, the valve is controlled to provide a series of short $CO_2$ injections. Thus, the injected CO 2 volume can be controlled by controlling the length of the injections, the time period between the injections, and the $CO_2$ pressure of the injections. It is submitted that when the length of the injections and/or the time period between the injections is/are used to control the amount of $CO_2$ injected in to the flow of water, simple open/closed valve can be used instead of a more complicated throttle valve.

In an embodiment, the device is configured to provide water without $CO_2$. In such an embodiment, the $CO_2$ source can be provided with a valve that can be closed to prevent $CO_2$ from being injected into the water flow. Also, in such an embodiment, the water carbonation system can be configured to allow water to pass the water conditioning chamber directly, i.e. without being held for a period of time, to thus promote any $CO_2$ present in the water to escape the water by providing a more turbulent flow and/or an instant pressure drop.

It has been found that a time frame of 1-4 seconds, for holding the single serve volume of carbonized water in the conditioning chamber, in combination with a single serve volume of 0.25 litre at a pressure of 2.5 bar is optimal. Subsequently, the pressure is dropped to atmospheric pressure or near atmospheric pressure over a time period of 1-3 seconds.

Furthermore, during the retention of the single serve volume of carbonized water in the conditioning chamber, the pressure in the chamber is reduced to an atmospheric or near atmospheric level. This drop in pressure preferably is a controlled pressure drop, i.e. is not an instantaneous pressure drop but involves a gradual reduction of pressure over a certain time frame, preferably said time frame being in the range of 1.5-3 seconds, for example being 1.5 seconds. In an embodiment, the time frame of the pressure drop matches with the period of time the single serve carbonized water volume is held in the conditioning chamber.

Thus, in an embodiment, three time periods can be distinguished with respect to the pressure inside the conditioning chamber. In a first time period, the pressure in the conditioning chamber increases due to the inflow of the single serve volume of carbonized water mixed with undissolved $CO_2$, and optionally due to additional $CO_2$ being injected into the conditioning chamber from the $CO_2$ source directly, up to a certain pressure level, for example of 2.5 bar. During the second time period the single serve is held at a substantially continuous pressure, for example at a pressure level of 2.5 bar. A degassing outlet can be used to keep the pressure inside the conditioning chamber at this level, and prevent an increase of the pressure due to degassing of the carbonised water held in the conditioning chamber. Subsequently, in the third time period, the pressure is lowered in a controlled fashion, for example over a period of 2 seconds, to atmospheric pressure or near atmospheric pressure, after which third time period the single serve volume of carbonized water is allowed to flow out of the conditioning chamber.

The invention thus provides an in-line water carbonation system, the system comprising a chilled water line, $CO_2$ source, an in-line carbonator, an in-line flow compensator and a carbonized water conditioning chamber. When a dispensing order is given, a single serve volume water is passed through the in-line water carbonation system to provide a single serve volume of carbonized water.

In an embodiment of a carbonized water dispensing device according to the invention, the water carbonation system comprises an in-line carbonator for the solubilization of $CO_2$ (carbon dioxide) in water, the in-line carbonator comprising:

a tubular conduit disposed about a longitudinal axis, extending from an input end to and output end, and defining a fluid flow path from the input end to the output end;

an inlet manifold comprising a first inlet for water, a second inlet for carbon dioxide, and an outlet in fluid communication with the input end of the conduit;

wherein the conduit comprises a first treatment trajectory followed by a conditioning trajectory followed by a second treatment trajectory;

wherein each treatment trajectory comprises:

a helical dispersion element disposed in the conduit and having an axis substantially aligned with the longitudinal axis of the conduit;

a passive accelerator located immediately downstream of the helical dispersion element, wherein the passive accelerator comprises a restriction portion of the conduit having a reduced cross sectional area relative to portions of the conduit immediately upstream and downstream of the restriction portion;

a rigid impact surface immediately downstream of the passive accelerator, which rigid impact surface is disposed substantially perpendicular to the longitudinal axis of the conduit; and wherein the conditioning trajectory comprises:

a conditioning conduit extending between the first and second treatment trajectories, the conditioning conduit having an axis substantially aligned with the longitudinal axis of the conduit.

In an embodiment of a carbonized water dispensing device according to the invention, the dispensing device is configured, preferably comprises a seat, for holding an ingredient cartridge downstream of the outlet valve of the carbonized water conditioning chamber and in the flow path of the carbonized water dispensed via said outlet valve, to mix the carbonized water with an ingredient, e.g. syrup, after the carbonized water has been held in the carbonized water conditioning chamber.

The invention furthermore provides a method for providing a single serve of carbonized water, preferably using a carbonized water dispensing device as above, wherein the method comprises the steps:

starting the dispensing process, e.g. by a consumer providing a user interface with a beverage dispensing order, the user interface subsequently actuating a carbonized water dispensing device to dispense a single serve volume of carbonized water;

passing a single serve water volume, preferably at a pressure of 5-9 bar, through an in-line carbonator and through a flow compensator, thus creating a mixture of carbonized water mixed with undissolved $CO_2$;

allowing the single serve volume of carbonized water to flow into the carbonized water conditioning chamber and thus increasing the pressure in the carbonized water conditioning chamber, preferably up to a pressure of 1.25-4 bar, for example about 1.5 bar;

optionally, keeping the pressure in the conditioning chamber below a predetermined pressure, preferably a predetermined pressure in the range of 1.25-4 bar;

optionally, after filling the conditioning chamber with the single serve carbonated water volume, hold the single serve carbonated water volume for a period in the range of 1-4 seconds, preferably in the range of 2-3 seconds, for example for 3 seconds;

reducing the pressure in the conditioning chamber to substantially atmospheric pressure, preferably after the single serve carbonized water volume has entered the conditioning chamber;

allowing the single serve water volume to flow out of the conditioning chamber, and via the dispensing outlet into a beverage container;

optionally: stimulating the single serve water volume to flow out of the conditioning chamber by providing a pressure slightly above atmospheric pressure, preferably by allowing pressurized $CO_2$ to flow into the conditioning chamber, and thus preferably provide an even flow rate.

According to a second aspect, the invention furthermore provides an apparatus for the solubilization of carbon dioxide in water, more in particular an in-line carbonator, for use in a carbonized water dispenser as disclosed above, such an apparatus for the solubilization of carbon dioxide in water comprising:

a tubular conduit disposed about a longitudinal axis, extending from an input end to and output end, and defining a fluid flow path from the input end to the output end;

an inlet manifold comprising a first inlet for water, a second inlet for carbon dioxide, and an outlet in fluid communication with the input end of the conduit;

wherein the conduit comprises a first treatment trajectory directly followed by a conditioning trajectory directly followed by a second treatment trajectory, such that the water subsequently flows from the first treatment trajectory into the conditioning trajectory into the second treatment trajectory;

wherein each treatment trajectory comprises:

a helical dispersion element disposed in the conduit and having an axis substantially aligned with the longitudinal axis of the conduit;

a passive accelerator located immediately downstream of the helical dispersion element, wherein the passive accelerator comprises a restriction portion of the conduit having a reduced cross sectional area relative to portions of the conduit immediately upstream and downstream of the restriction portion;

a rigid impact surface immediately downstream of the passive accelerator, which rigid impact surface is disposed substantially perpendicular to the longitudinal axis of the conduit; and wherein the conditioning trajectory comprises:

a conditioning conduit extending between the first and second treatment trajectories, the conditioning conduit having an axis substantially aligned with the longitudinal axis of the conduit.

Thus, with such a carbonator the treatment trajectories are repeated without adding more $CO_2$ between them, but instead allow for settling of the $CO_2$ prior to again subjecting the mixture of carbonized water mixed with undissolved $CO_2$ to a second treatment trajectory, said treatment trajectory starting with the mixture passing through a dispersion element arranged within the conduit to create a dispersed flow. It has been found that this configuration provides an increased solubilization of carbon dioxide in water comprising.

In an embodiment of a carbonator according to the second aspect of the invention, the rigid impact surface is provided in the form of a rib member that bridges the conduit in a direction substantially perpendicular of the longitudinal axis of the conduit, such that a part of the rib member fills a central portion of the conduit and the rib member defines two peripheral flow paths located outside of the central portion of the conduit; and wherein the tubular conduit, helical dispersion elements, and restriction portions are substantially aligned along the central longitudinal axis of the conduit, and the peripheral flow paths are offset from the central longitudinal axis of the conduit in a direction transverse to the central longitudinal axis of the conduit.

The rib member extends across the conduit, and therefore across the flow path of the mixture of carbonized water and $CO_2$. The rib member thus splits the flow path into two parallel flow paths, which are located on opposite sides of the rib member. Furthermore, the rib member extends in a direction parallel to the flow path, and thus guides the two flows of carbonized water and undissolved $CO_2$, which provides a more laminar flow compared to prior art impact surfaces. The rib member thus combines a more laminar flow with an increase in pressure, and thus promotes the solubilization of $CO_2$ in the water.

The combination of an impact surface at the central portion of the conduit and two peripheral flow paths located outside of the central portion of the conduit combines a pressure increase in the carbonized water and $CO_2$ mixture, and thus an increase in the $CO_2$ content of the carbonized water.

It is submitted that the feature that the rigid impact surface is provided in the form of a rib member that bridges the conduit in a direction substantially perpendicular of the longitudinal axis of the conduit, can also be provided in an in-line carbonator comprising a single conditioning trajectory.

In an embodiment of a carbonator according to the second aspect of the invention, the restriction portion of the passive accelerators has an energy loss coefficient in the range of 0.1 to 0.44.

In an embodiment of a carbonator according to the second aspect of the invention, the impact surface is spaced from the restriction, preferably such that the helical dispersion element extends along substantially half of the treatment trajectory and the passive accelerator extends along substantially half of the treatment trajectory.

In an embodiment of a carbonator according to the second aspect of the invention, the conditioning trajectory comprises an expanding section, i.e. having in an increase in diameter in the flow direction, followed by a section having a continuous diameter, wherein the first and second section each extend along substantially half of the conditioning trajectory.

In an embodiment of a carbonator according to the second aspect of the invention, the conditioning trajectory and the treatment trajectories each have a substantially similar length.

In an embodiment of a carbonator according to the second aspect of the invention, the helical dispersion element is located downstream of the inlet and upstream of the rigid impact surface and are configured to mix the carbon dioxide and water to create an annularly-dispersed flow in the conduit;

The passive accelerator is configured to accelerate the annular-dispersed flow of carbon dioxide and water and direct the accelerated flow of carbon dioxide and water to collide with the rigid surface, thereby creating a pressure sufficient to solubilize the carbon dioxide into the water.

In an alternative embodiment of a carbonized water dispensing device according to the invention, the water carbonation system comprises an in-line carbonator for the solubilization of $CO_2$ (carbon dioxide) in water, the in-line carbonator comprising:

a tubular conduit disposed about a longitudinal axis, extending from an input end to and output end, and defining a fluid flow path from the input end to the output end;

an inlet manifold comprising a first inlet for water, a second inlet for carbon dioxide, and an outlet in fluid communication with the input end of the conduit;

wherein the conduit comprises a first treatment trajectory followed by a conditioning trajectory followed by a second treatment trajectory;

wherein each treatment trajectory comprises:

a helical dispersion element disposed in the conduit and having an axis substantially aligned with the longitudinal axis of the conduit;

a passive accelerator located immediately downstream of the helical dispersion element, wherein the passive accelerator comprises a restriction portion of the conduit having a reduced cross sectional area relative to portions of the conduit immediately upstream and downstream of the restriction portion;

a rigid impact surface immediately downstream of the passive accelerator, which rigid impact surface is disposed substantially perpendicular to the longitudinal axis of the conduit; and wherein the conditioning trajectory comprises:

a conditioning conduit extending between the first and second treatment trajectories, the conditioning conduit having a U-shaped axis, and wherein the first treatment trajectory is located adjacent the second treatment trajectory.

As was already set out above, with such a carbonator the treatment trajectories are repeated without adding more $CO_2$ between them, i.e. $CO_2$ is only added at the inlet manifold, and thus allows for settling of the $CO_2$ prior to again subjecting the mixture of carbonized water mixed with undissolved $CO_2$ to a second treatment trajectory.

Advantageous embodiments of the water dispenser according to the invention and the method according to the invention are disclosed in the subclaims and in the description, in which the invention is further illustrated and elucidated on the basis of a number of exemplary embodiments, of which some are shown in the schematic drawing.

DETAILED DESCRIPTION

Figure 1:
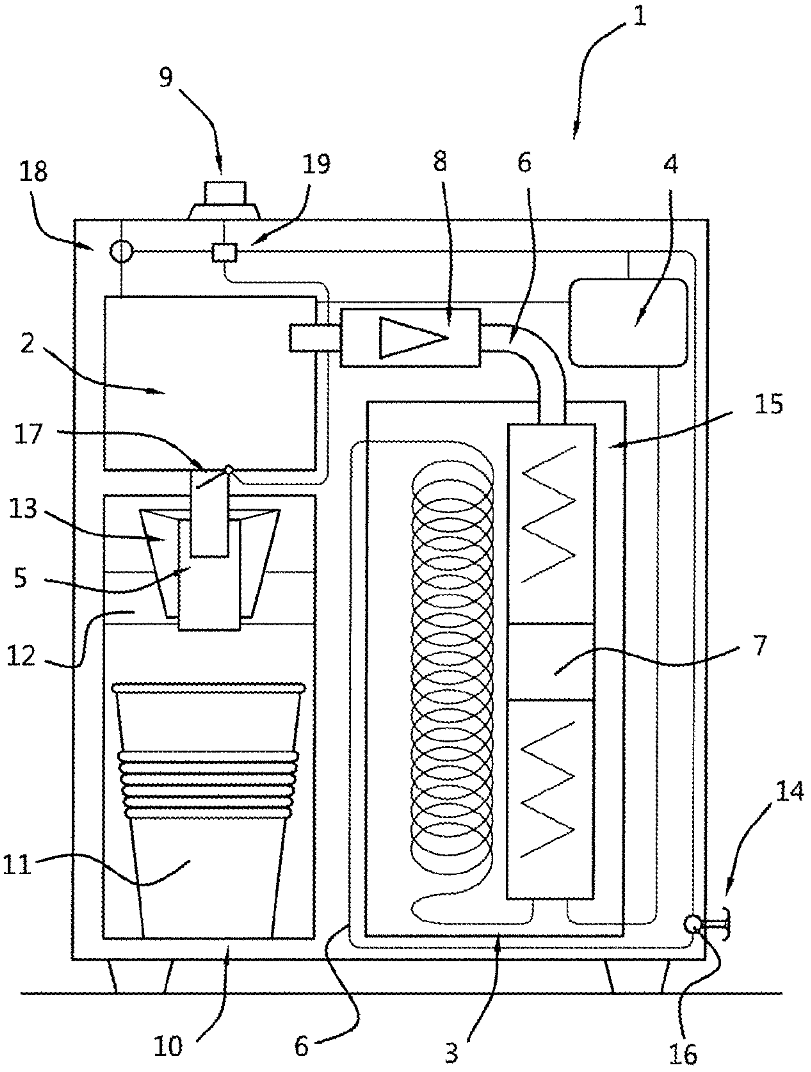
FIG. 1 is a schematic drawing of an exemplary embodiment of a carbonized water dispensing device according to the invention.

FIG. 1 shows a schematic drawing of an exemplary embodiment of a carbonized water dispensing device 1 according to the invention. It is noted that the diagram shows the dispensing device partially in cross section and that components have been simplified for explanatory purpose.

According to the present invention, the carbonated water dispenser 1 features an in-line conditioning chamber 2. The carbonized water dispensing device 1 further comprises a cold water source 3, a $CO_2$ source 4, a carbonized water dispensing outlet 5 and a water line 6 extending between the cold water source 3 and the dispensing outlet 5. The water line 6 comprises an in-line carbonator 7, an in-line flow compensator 8, and a user interface 9.

In the exemplary embodiment shown, the carbonized water dispensing device 1 is configured to mix the carbonized water with an ingredient, e.g. syrup, after the carbonized water has been held in the carbonized water conditioning chamber 2. Therefore, the dispensing device 1 comprises a seat 12 for holding an ingredient cartridge 13 downstream of the carbonized water conditioning chamber 2 and in the flow path of the carbonized water dispensed from the carbonized water conditioning chamber 2, to mix the carbonized water with an ingredient, e.g. syrup, after the carbonized water has been held in the carbonized water conditioning chamber.

In the embodiment shown, the carbonized water dispensing outlet 5 is configured for dispensing a single serve carbonized water volume into a beverage container. The dispensing device 1 furthermore comprises a beverage container support surface 10, which in FIG. 1 supports a beverage container in the form of a cup 11 below the carbonized water dispensing outlet for receiving a single serve carbonized water volume, in the embodiment shown mixed with an ingredient, preferably a syrup.

The cold water source 3 is configured for providing multiple servings, preferably at least five servings.

In the embodiment shown, the cold water source 3 comprises a water supply 14 that consists of a simple municipal or well water feed. The cold water source 3 furthermore comprises an extension of the water line 6, which extension passes through a chiller configured to cool the water in the water line. In the embodiment shown, the chiller is provided in the form of a reservoir 15 that comprises a volume of cold water. The water line 6 passes through said volume of cold water, in the embodiment shown in a spiral configuration to maximize the cooling effect, such that the water line, and thus the water in the water line is cooled.

In an alternative embodiment, the cold water source 3 comprises a cooling reservoir having a volume of multiple servings. This reservoir could in turn be connected to a simple municipal or well water feed to keep the reservoir level constant. It is noted that the water held in the reservoir is to be carbonated after a consumer has entered a dispensing instruction into the user interface. Furthermore, from the reservoir single serve volumes are dispensed into the water line once a consumer has entered a dispensing instruction into the user interface.

Furthermore, in the embodiment shown, the section of the water line 6 comprising the in-line carbonator 7 is located within the volume of cold water of the cold water reservoir 15, such that water and $CO_2$ are cooled while being mixed.

In a preferred embodiment, the cold water source also comprises a pump to provide a consistent water pressure. As the pressure at a typical home or commercial water tap may vary from location to location or from time to time, providing a pump will ensure that the apparatus receives a consistent pressure no matter what the local supply pressure is. Such a water pump is configured to pump a single serve volume of carbonized water under pressure, preferably a pressure through the water line and through the carbonized water dispensing outlet.

The $CO_2$ source 4 is connected to the in-line carbonator 7 and to the carbonized water conditioning chamber 2 to provide each of them with $CO_2$. The $CO_2$ source 4 can be embodied by any known way for supplying a gas. A commercially available $CO_2$ canister is preferably used. The $CO_2$ source would typically be connected through a regulator, which provides a controlled supply pressure to the in-line carbonator.

The in-line carbonator 7 is configured for adding $CO_2$ to the water provided by the cold water source 3. The in-line carbonator, or solubilizer, can be an in-line carbonator known from the prior art. In FIG. 1 the in-line carbonator is schematically depicted. Preferably, the in-line carbonator is configured as the in-line carbonator shown in FIG. 2, which will be discussed in more detail further below.

The in-line carbonator 7 is provided in the water line 6, and is connected to the $CO_2$ source 4, for adding $CO_2$ from the $CO_2$ source to the water flowing through the water line from the water cooling reservoir to the carbonized water dispensing outlet.

The in-line flow compensator 8 is provided in the water line 6, downstream of the in-line carbonator 7, for conditioning the mixture of carbonized water mixed with undissolved $CO_2$ from the in-line flow compensator.

According to the invention, the carbonized water dispenser 1 comprises the carbonized water conditioning chamber 2. The conditioning chamber 2 is provided downstream of the flow compensator 8 and upstream of the carbonized water dispensing outlet 5, for receiving a mixture of carbonized water mixed with undissolved $CO_2$ from the in-line flow compensator 8.

The carbonized water conditioning chamber 2 is provided with an outlet valve 17 and a gas outlet 18.

The outlet valve 17 is configured for, in a closed condition, enabling the carbonized water conditioning chamber 2 to hold the single serve volume of carbonized water, and for, in an open condition, allowing the single serve volume of carbonized water to flow out of the carbonized water conditioning chamber 2 and subsequently out of the carbonized water dispensing outlet into the beverage container 11.

The gas outlet 18 is configured for, in a closed condition, preventing undissolved $CO_2$, which enters the conditioning chamber in combination with the single serve volume of carbonized water, from escaping the conditioning chamber. Thus, the undissolved $CO_2$ is retained in the conditioning chamber while the single serve volume of carbonized water is received, which results in a pressure increase in the chamber. Preferably, the gas outlet thus enables a pressure increase of up to 1.25-4 bar or more in the conditioning chamber during the inflow of the mixture of the single serve volume of carbonized water and the undissolved $CO_2$.

The gas outlet 18 is furthermore configured for, in an open condition, allowing undissolved $CO_2$ to escape the conditioning chamber, and thus for the pressure in the conditioning chamber 2 to lower to atmospheric pressure or near atmospheric pressure, prior to the single serve carbonized water volume flowing out of the conditioning chamber.

According to the invention, the conditioning chamber 2 is dimensioned to hold a single serve of carbonized water with a headspace. Furthermore, the carbonized water dispensing device is configured to, upon receiving a beverage dispensing order, provide the empty carbonized water conditioning chamber with a single serve volume of carbonized water, and hold the single serve of carbonized water prior to dispensing the single serve volume of carbonized water. Once the single serve volume of carbonized water is drained from the conditioning chamber, the conditioning chamber remains empty until a new beverage dispensing order is received and a new beverage is dispensed.

The user interface 9 comprising a control device 19 configured to receive a beverage dispensing order, and subsequently actuate the carbonized water dispensing device to dispense a single serve volume of carbonized water. In the embodiment shown, the interface 9 is provided in the form of an electronic interface, more in particular an interface comprising a push button that allows a consumer to actuate the dispenser and thus dispense a single serve volume of carbonized water.

In the embodiment shown, the user interface is connected to a valve 16, which in an open condition allows water to flow from the water supply 14 into the water line 6, to the $CO_2$ source 4, for providing the carbonator with $CO_2$, to the outlet valve 17 for allowing the single serve volume of carbonized water to flow out of the carbonized water conditioning chamber after it has been held, and to the gas outlet 18 to allow the pressure in the conditioning chamber to lower to atmospheric pressure or near atmospheric pressure prior to the single serve carbonized water volume flowing out of the conditioning chamber.

Figure 2:
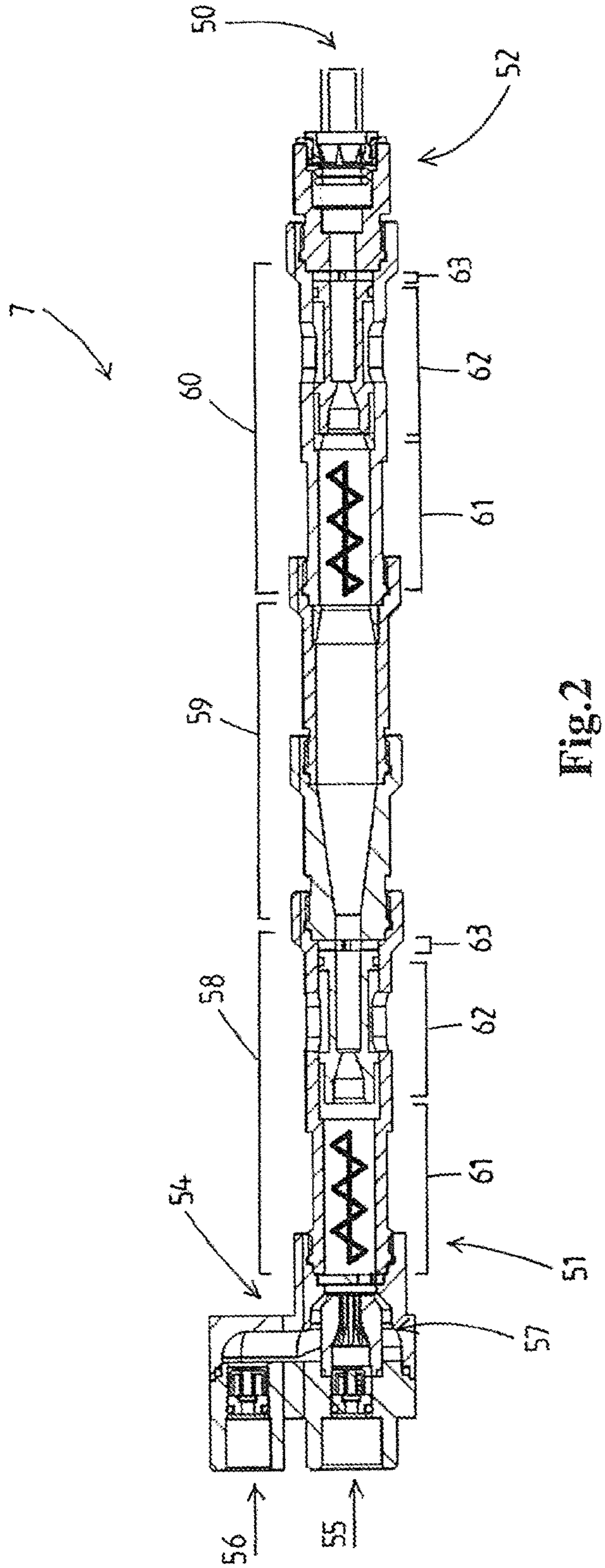
FIG. 2 shows a detailed side view in cross section of an exemplary embodiment of an in-line carbonator according to the invention.

FIG. 2 shows a detailed side view in cross section of the in-line carbonator 7 according to the invention. The in-line carbonator, or apparatus for the solubilization of carbon dioxide in water, comprises a tubular conduit 51 disposed about a longitudinal axis, extending from an input end 52 to and output end 53, and defining a fluid flow path from the input end to the output end.

The in-line carbonator further comprises an inlet manifold 54 comprising a first inlet for water a second inlet 56 for carbon dioxide, and an outlet 57 in fluid communication with the input end 51 of the tubular conduit 50.

The conduit 50 comprises a first treatment trajectory 58 followed by a conditioning trajectory 59 followed by a second treatment trajectory 60. According to the invention, each treatment trajectory comprises a helical dispersion element 61, a passive accelerator 62, and a rigid impact surface 63.

The helical dispersion element 61 is disposed in the conduit 50 and having an axis substantially aligned with the longitudinal axis of the conduit.

The passive accelerator 62 is located immediately downstream of the helical dispersion element 61. The passive accelerator 62 comprises a restriction portion of the conduit 50 having a reduced cross sectional area relative to portions of the conduit immediately upstream and downstream of the restriction portion.

The rigid impact surface 63 is provided immediately downstream of the passive accelerator 62. The rigid impact surface 63 is disposed substantially perpendicular to the longitudinal axis of the conduit 50.

The conditioning trajectory 59 comprises a conditioning conduit extending between the first treatment trajectory 58 and the second treatment trajectory 60. The conditioning conduit has an axis substantially aligned with the longitudinal axis of the conduit.

The carbonized water dispensing device 1 is configured for providing a single serve of carbonized water.

When a consumer provides the user interface 9 with a beverage dispensing order, thus starting the dispensing process, the user interface subsequently actuates the carbonized water dispensing device 1 to dispense a single serve volume of carbonized water. Thus, a single serve water volume is passed through the in-line carbonator 7 and through the in-line flow compensator 8, thus creating a mixture of carbonized water mixed with undissolved $CO_2$.

In the particular embodiment shown, the solubilization of carbon dioxide in water is achieved by providing the in-line carbonator 7 with water and $CO_2$. The water and $CO_2$ are mixed and create an annular-dispersed flow in the helical dispersion element 61. Subsequently, the mixture of carbonized water mixed with undissolved $CO_2$ is accelerated in the passive accelerator 62, after which the mixture of carbonized water mixed with undissolved $CO_2$ is directed to collide with the rigid impact surface 63, thereby creating a pressure sufficient to solubilize the carbon dioxide into the water.

The mixture of carbonized water mixed with undissolved $CO_2$ is than passed through a conditioning conduit of the conditioning trajectory 59, after which an annular-dispersed flow is created in the second helical dispersion element. The mixture of carbonized water mixed with undissolved $CO_2$ is accelerated in the second accelerator, and is directed to collide with the rigid impact surface 63, thereby creating a pressure sufficient to solubilize the carbon dioxide into the water.

The mixture of carbonized water with undissolved $CO_2$ is subsequently passed through the in-line flow compensator 8 and is collected in the carbonized water conditioning chamber 2.

The single serve volume of carbonized water is allowed to flow into the carbonized water conditioning chamber 2 and thus increases the pressure in the carbonized water conditioning chamber, preferably up to a pressure of 1.25-4 bar, for example about 1.5 bar.

In the embodiment shown, the carbonized water conditioning chamber 2 is provided with the gas outlet 18, which is configured to keep the pressure in the conditioning chamber below a predetermined pressure, in the embodiment shown at 1.25 bar.

After the conditioning chamber 2 has been filled with the single serve carbonated water volume, the single serve carbonated water volume is held for a period in the range of 2 seconds. Then, the pressure in the conditioning chamber is reduced to substantially atmospheric pressure.

The single serve carbonized water volume is allowed to flow out of the conditioning chamber 2, and via the dispensing outlet 5 into a beverage container 11. In the preferred embodiment shown, the dispensing device is 1 comprises a seat 12 for holding the ingredient cartridge 13 downstream of the outlet valve 17 of the carbonized water conditioning chamber 1 and in the flow path of the carbonized water dispensed via said outlet valve 17, to mix the carbonized water with an ingredient, e.g. syrup, after the carbonized water has been held in the carbonized water conditioning chamber.

A dispenser according to the invention is configured to provide a consumer with a predetermined volume of carbonized water. The predetermined volume can be received in a beverage container, e.g. a glass or cup. In an embodiment, the dispenser is configured for also allowing a consumer to fill a bottle with carbonized water.

According to the invention, the mixture of the single serve volume of carbonized water and the undissolved $CO_2$ flows from the in-line flow compensator into the carbonized water conditioning chamber, which chamber is located downstream of the in-line flow compensator. The single serve volume of carbonated water is subsequently held under pressure in that conditioning chamber, after which the pressure is lowered and the single serve volume is dispensed at atmospheric or near atmospheric pressure. It is submitted that the temporarily retention in the carbonized water conditioning chamber is part of the in-line carbonization processes, i.e. the solubilization of $CO_2$ (carbon dioxide) in the single serve water volume. Therefore, carbonized water enters the conditioning chamber only during a dispensing cycle, the carbonized water conditioning chamber does not hold more than a single serve volume of carbonized water, and does not hold any substantial water volume between dispensing cycles. Furthermore, in-line mixing of the single serve volume of carbonized water with any ingredient, e.g. syrup, will take place downstream of the carbonized water conditioning chamber.

The invention is advantageously used in an in-line carbonization device for dispensing predetermined single serve volumes of carbonized water. In such a configuration, the water is carbonized using an in-line carbonator and an in-line flow compensator. With each serving, only the volume of water required for a single serve, i.e. a metered single serve volume, is carbonized while being dispensed. Thus, there is no reservoir, or a carbonating tank or saturator, for storing a large volume of pre-carbonized water, i.e. water carbonized prior to a consumer providing a dispensing order. Furthermore, because the dispenser is able to provide beverages with a relatively high $CO_2$ content, a carbonized water dispensing device according to the invention is in particular useful in providing soda beverages, more in particular for in-line mixing the single serve carbonized water volume with an ingredient, e.g. a syrup or extract, since these types of drinks are typically associated with high $CO_2$ content.

The invention claimed is:

1. A carbonized water dispensing device comprising:

a carbonized water dispensing outlet, for dispensing carbonized water into a beverage container;

a cold water source;

a $CO_2$ source;

a water line, the water line extending between the cold water source and a dispensing outlet;

a water carbonation system comprising an in-line carbonator for adding $CO_2$ from the $CO_2$ source to the water flowing through the water line from the cold water source to the dispensing outlet, wherein the in-line carbonator comprises:

a tubular conduit disposed about a longitudinal axis, extending from an input end to and output end, and defining a fluid flow path from the input end to the output end;

an inlet manifold comprising a first inlet for water, a second inlet for carbon dioxide, and an outlet in fluid communication with the input end of the conduit;

wherein the conduit comprises a first treatment trajectory directly followed by a conditioning trajectory directly followed by a second treatment trajectory, such that the water subsequently flows from the first treatment trajectory into the conditioning trajectory into the second treatment trajectory;

wherein each treatment trajectory comprises:

a helical dispersion element disposed in the conduit and having an axis aligned with the longitudinal axis of the conduit;

a passive accelerator located immediately downstream of the helical dispersion element, wherein the passive accelerator comprises a restriction portion of the conduit having a reduced cross sectional area relative to portions of the conduit immediately upstream and downstream of the restriction portion;

a rigid impact surface immediately downstream of the passive accelerator, which rigid impact surface is disposed perpendicular to the longitudinal axis of the conduit; and wherein the conditioning trajectory comprises:

a conditioning conduit extending between the first and second treatment trajectories, the conditioning conduit having an axis aligned with the longitudinal axis of the conduit.

2. Apparatus according to claim 1, wherein the rigid impact surface is provided in the form of a rib member that bridges the conduit in a direction perpendicular to the longitudinal axis of the conduit, such that a part of the rib member fills a central portion of the conduit and the rib member defines two peripheral flow paths located outside of the central portion of the conduit.

3. Apparatus according to claim 2, wherein the tubular conduit, helical dispersion elements, and restriction portions are aligned along the central longitudinal axis of the conduit, and the peripheral flow paths are offset from the central longitudinal axis of the conduit in a direction transverse to the central longitudinal axis of the conduit.

4. Apparatus according to claim 1, wherein the restriction portion of the passive accelerators has an energy loss coefficient in the range of 0.1 to 0.44.

5. Apparatus according to claim 1, wherein the impact surface is spaced from the restriction.

6. Apparatus according to claim 5, wherein the impact surface is spaced from the restriction such that the helical dispersion element extends along half of the treatment trajectory and the passive accelerator extends along half of the treatment trajectory.

7. Apparatus according to claim 1, wherein the conditioning trajectory comprises an expanding section, having in an increase in diameter in the flow direction, followed by a section having a continuous diameter, wherein the first and second section each extend along half of the conditioning trajectory.

8. Apparatus according to claim 1, wherein the conditioning trajectory and the treatment trajectories each have a similar length.

9. A carbonator, comprising:

a tubular conduit disposed about a longitudinal axis, extending from an input end to and output end, and defining a fluid flow path from the input end to the output end;

an inlet manifold comprising a first inlet for water, a second inlet for carbon dioxide, and an outlet in fluid communication with the input end of the conduit;

wherein the conduit comprises a first treatment trajectory directly followed by a conditioning trajectory directly followed by a second treatment trajectory, such that the water subsequently flows from the first treatment trajectory into the conditioning trajectory into the second treatment trajectory;

wherein each treatment trajectory comprises:

a helical dispersion element disposed in the conduit and having an axis aligned with the longitudinal axis of the conduit;

a passive accelerator located immediately downstream of the helical dispersion element, wherein the passive accelerator comprises a restriction portion of the conduit having a reduced cross sectional area relative to portions of the conduit immediately upstream and downstream of the restriction portion;

a rigid impact surface immediately downstream of the passive accelerator, which rigid impact surface is disposed perpendicular to the longitudinal axis of the conduit; and wherein the conditioning trajectory comprises:

a conditioning conduit extending between the first and second treatment trajectories, the conditioning conduit having an axis aligned with the longitudinal axis of the conduit.

10. Method for the solubilization of carbon dioxide in water using an apparatus according to claim 9, the method comprising the steps:

providing the apparatus with water and $CO_2$;

mix the water and $CO_2$ and create an annular-dispersed flow with the helical dispersion element;

accelerate the mixture of carbonized water mixed with undissolved $CO_2$ in the accelerator;

direct the mixture of carbonized water mixed with undissolved $CO_2$ to collide with the rigid surface, thereby creating a pressure sufficient to solubilize the carbon dioxide into the water;

pass the mixture of carbonized water mixed with undissolved $CO_2$ through a conditioning conduit;

create an annular-dispersed flow in the second helical dispersion element;

accelerate the mixture of carbonized water mixed with undissolved $CO_2$ in the second accelerator;

direct the mixture of carbonized water mixed with undissolved $CO_2$ to collide with the rigid surface, thereby creating a pressure sufficient to solubilize the carbon dioxide into the water.

11. Method according to claim 10, wherein the method further comprises the step:

passing the mixture of carbonized water with undissolved $CO_2$ through a flow compensator and collecting the mixture of carbonized water with undissolved $CO_2$ in a carbonized water conditioning chamber, prior to dispensing the carbonized water.

12. Method according to claim 11, wherein the method further comprises step:

mixing the carbonized water with an ingredient.

* * * * *